March 13, 1945. J. J. STAMM 2,371,555
VARIABLE SPEED CONTROL SYSTEM
Filed March 16, 1943
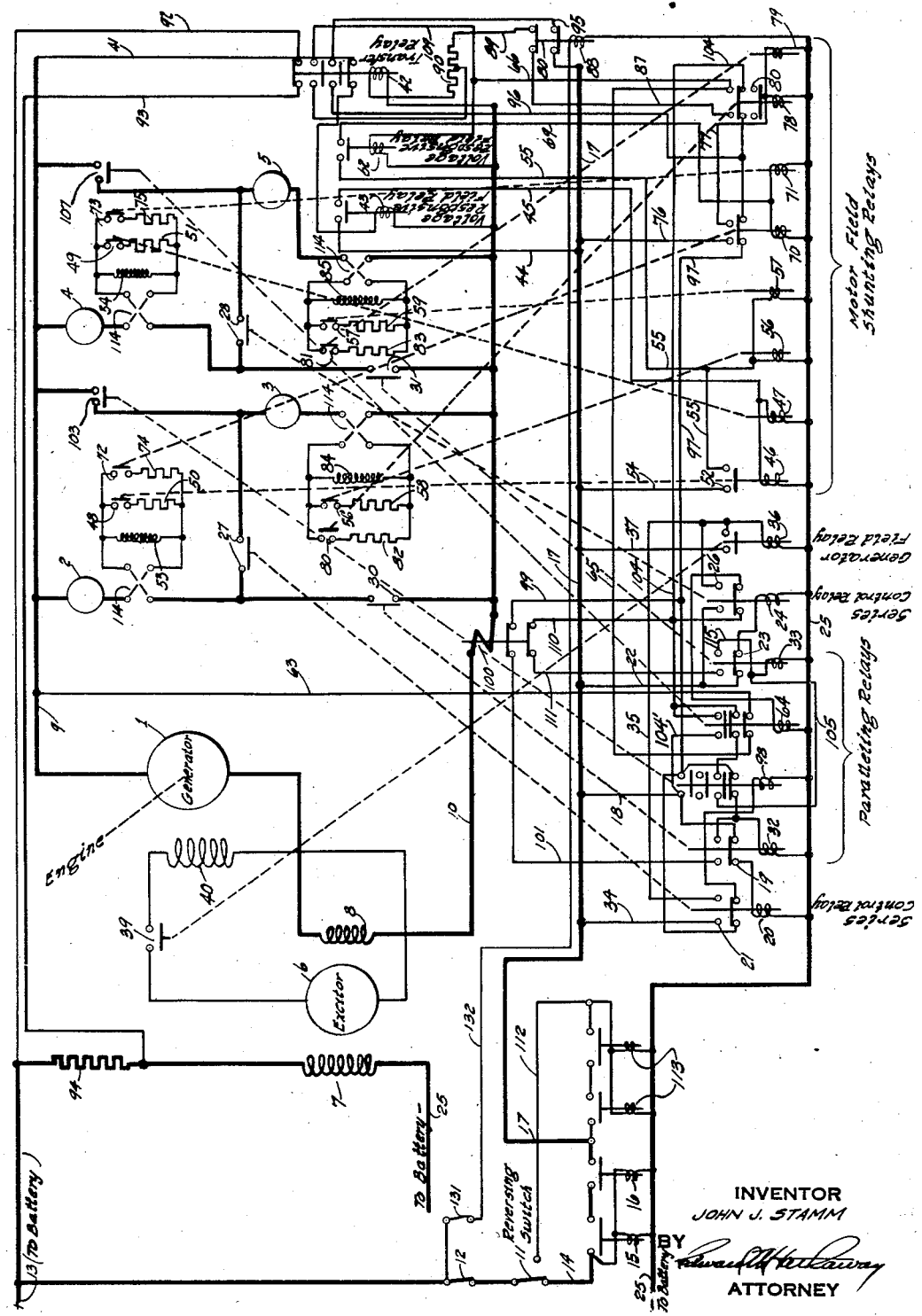
INVENTOR
JOHN J. STAMM
BY
ATTORNEY Patented Mar. 13, 1945

2,371,555

UNITED STATES PATENT OFFICE

2,371,555

VARIABLE SPEED CONTROL SYSTEM

John J. Stamm, Chester Heights, Pa., assignor to The Baldwin Locomotive Works, a corporation of Pennsylvania Application March 16, 1943, Serial No. 479,389

14 Claims. (Cl. 172—179)

This invention relates generally to variable speed control of electric motor driven apparatus, particularly of the type in which the electric current is supplied from an engine driven generator of an internal combustion engine locomotive such as a Diesel electric locomotive.

While my invention is directed particularly to locomotives preferably those employed in what is known as transfer service, yet the invention may be equally applicable to other fields of use in which problems are encountered similar to those of locomotive transfer service. In such transfer service a locomotive is used through a wide range of speed and load conditions as, for example, in switching freight cars or other rolling stock in freight yards involving short distances of movement at relatively slow speeds and finally in taking a group of assembled freight cars and transferring them at relatively high speed to some location, possibly several miles distance. The short and frequent switching back and forth at low speeds combined with the necessity of being able to transfer a large load at high speed for a considerable distance requires an extraordinary degree of flexibility of operation of the motive power equipment of the locomotive. Various arrangements have been proposed and used in an attempt to meet this required flexibility, but such apparatus has been structurally or functionally deficient under certain exacting conditions of operation. It has heretofore been suggested to employ a rather large or expensive speed governing apparatus for the engine or to use a large size generator or a combination of the same, but even then the resultant action has been functionally deficient under certain conditions.

It is an object of my invention to provide an improved speed control system for an engine-generator-motor driven apparatus whereby a high degree of flexibility of speed and power may be obtained in a relatively smooth and continuous manner. A further object is to provide an improved speed control system for a locomotive having an engine driven generator and a plurality of driving motors whereby the locomotive speed may be substantially uniformly increased or decreased from minimum to maximum or maintained at any desired intermediate speed without danger of imposing stalling loads upon the engine when passing from one speed to another thereby to allow a generator and speed governor equipment of reasonable size and capacity to be used.

Other objects and advanatges will be more apparent to those skilled in the art from the following description of the accompanying drawing in which the figure is a wiring diagram of my improved system.

The locomotive includes an engine driven generator 1 and any suitable number of usual power trucks (not shown) driven by motors specifically shown as, but not necessarily limited to, four in number indicated at 2, 3, 4 and 5. Inasmuch as the details of construction of the locomotive and its various accessories do not constitute a part of my present invention they need not be further described.

In the present invention the motors 2 and 3 commonly drive one truck and the motors 4 and 5 commonly drive another truck. My improved control system disclosed herein is adapted during low speed operation of the locomotives to have the motors 2 and 3 connected in what is herein referred to as series-parallel and during higher speeds to have all motors connected in parallel. In series-parallel operation the two motors 2 and 3 are connected in series as a unit and the motors 4 and 5 are connected in series as a unit but the two series units are connected in parallel across the main generator 1. During parallel operation each motor individually is connected in parallel across the generator. The foregoing mode of operation is so coordinated with the control of the main generator that the load on the engine and generator is never completely shut off even during shifting of the motors through their various sequential control steps thereby producing a smooth and continuous acceleration of the locomotive from no speed up to a maximum high speed. A usual generator exciter 6 driven by the engine has a battery exciter field 7 and a differential field 8, the latter, as usual, being in series with the main generator leads 9 and 10.

SERIES-PARALLEL OPERATION

The combination of electrical elements in my improved system will be more apparent by describing its operation. The generator engine (not shown) is first started and a reversing controller switch 11 is placed in its forward running position as shown. The engine is then stepped up preferably to its top speed by operation of a usual throttle lever (not shown) and simultaneously therewith a switch 12 herein referred to as a throttle switch is closed. Closure of the throttle switch 12 connects one side of a battery line 13 to a wire 14 thereby to energize a pair of forward running reversing interlock coils 15 and 16 which close their contacts for forward operation and establish a circuit from wire 14 to wires 17 and 18 and thence across normally closed lower contacts 19 and through a series control solenoid 20 for motors 2 and 3 to the other side of the battery line. Energizing solenoid 20 will close upper switch contacts 21. Similarly, a circuit from wire 17 is established through a wire 22 across normally closed contacts 23 to a second series control solenoid 24 for motors 4 and 5 and thence to a line 25 leading to the other battery terminal. Energizing solenoid 24 closes the upper switch contact 26 thereof and also closes the contacts 28, the switch arms for these two sets of contacts being diagrammatically shown as connected together by a dotted line for common actuation by the solenoid 24. A similar diagrammatic dotted line arrangement is used herein for other multiple switches operated by a common solenoid. The relays 20 and 24 are also shown in the lower part of the diagram as having one switch bar between their upper and lower contacts. Continuing with the operation, closure of the upper set of contacts 21 and 26 is accompanied by simultaneous closure of contacts 27 and 28 which, as seen in the upper part of the diagram, will place motors 2 and 3 in series and similarly motors 4 and 5 in series, both sets of series connected motors, however, being connected in parallel across the generator lines 9 and 10. During this preliminary operation a pair of so-called parallel interlock switch contacts 30 and 31 are open thereby preventing parallel operation of the individual motors, these contacts being controlled by a pair of solenoids 32 and 33 which are de-energized by reason of the lower set of contacts of series control solenoids 20 and 24 being opened upon energization of these latter solenoids as previously described. The interlock circuit between the lower set of contacts of the series control solenoids 20 and 24 with the parallel interlock solenoids 32 and 33 will be described later.

Upon closure of upper contacts 21 of series control solenoid 20 a circuit is established from wire 17 through wires 34, 35 and a generator field contactor coil 36 to close the contacts of this coil. A holding circuit for coil 36 is thereupon established through a wire 37 and coil 36 to wire 25. The coil 36 has a pair of contacts 39 in the exciter circuit which, for purposes of simplicity, are separated from the lower showing of solenoid 36. Hence upon energization of solenoid 36 the holding circuit through wire 37 is established and simultaneously the contacts 39 are closed to permit current to build up in the exciter circuit which, in turn, builds up generator voltage by energization of a main generator field 40. By reason of the series control contacts 27 and 38 being closed current is permitted to flow from the generator 1 through leads 9 and thence through motors 2 and 3 in series and similarly through motors 4 and 5 in series and thence to the other generator lead 10. Thus the two sets of series connected motors are connected in parallel across the main generator to constitute the series-parallel connection of the motors.

As the locomotive speeds up under the foregoing series-parallel connections current in the motors will decrease and the voltage will increase. During this time a circuit exists from the generator lead 9 through a wire 41, across the lowermost contacts of a de-energized transfer relay 42 to a voltage responsive motor field relay 43 and thence to the other generator lead 10, the relay 43 initiating a decrease of the motor field strength to speed up the locomotive. For example, when a predetermined generator voltage is reached of say 500 volts, voltage responsive relay 43 will become sufficiently energized to close its contacts to establish a circuit from line 17 through wires 44, 45 and through a pair of motor fields shunting relay coils 46 and 47 to close their contacts 48 and 49 which shunt out resistances 50 and 51 of motors 2 and 4 respectively. The relay 46 has two sets of switch contacts both adapted to be closed simultaneously upon energization of said relay, one set of these contacts being indicated at 48 and the other set at 52. The energization of motor field relay 46 not only establishes a resistance shunt 50 around the motor field 53, but also the closure of contacts 52 sequentially establishes a circuit through wire 54 across contacts 52 and wire 55 to energize motor field shunting relays 56 and 57 for cutting in field shunting resistances 58 and 59 of motors 3 and 5. The contacts of these relays are indicated at 56' and 57'. The locomotive speed will increase as the foregoing field shunting resistances of, first, motors 2 and 4 and then of motors 3 and 5, are sequentially cut in.

As the locomotive speed increases still further, the generator voltage will correspondingly further increase until it reaches a predetermined value of say 525 volts that will cause closure of a second voltage responsive motor field relay 62 which will be energized by current through a circuit from main generator lead 9, wire 63 across the lowermost contacts of a de-energized motor parallel interlock relay 64 and thence through wires 65 and 66 and relay 62 to lead 10 of the other side of the main generator. The foregoing closure of the contacts of motor field relay 62 establishes a circuit from battery line 17 through wire 54, contacts 52 and wire 55 across the contacts of motor field relay 62, wire 69 and motor field relays 70 and 71, and thence to the other side of the battery wire 25. Energization of the motor field shunting relays 70 and 71 closes contacts 72 and 73 to cut in resistances 74 and 75 to further shunt fields 53 and 54 of motors 2 and 4. Energization of motor field relay 70 closes a set of contacts to sequentially establish a circuit from wire 17 through wires 76 and 77 to energize motor field shunting relays 78 and 79. Energization of these relays 78 and 79 closes contacts 80 and 81 of motors 3 and 5 thereby cutting in shunting resistances 82 and 83 for the fields 84 and 85 of motors 3 and 5. This operation follows in sequence the shunting of the corresponding resistances for motors 2 and 4. Simultaneously with closure of the motor field contactors 80 and 81 the relay 78 further simultaneously closes a circuit from wire 65 through wire 87 across an upper set of contacts a manually controlled relay 88 and wire 89 and resistor 90 to the coil of transfer relay 42 and thence to the generator lead 10.

The voltage responsive relays 43 and 62 are, as above explained, respectively set for two different voltages thus giving a two step speed control of the motor field shunting resistances.

If series relay 20 fails to close upon initial closure of switches 11 and 12, or if for any reason it is desired to cut out the operation of series control relay 20, then generator field relay 36 is energized upon energization of series relay 24 to close contacts 26 which establishes a circuit from wire 22 to relay 36.

TRANSFER FROM SERIES-PARALLEL TO PARALLEL OPERATION

As the speed of the locomotive still further increases the generator voltage will correspondingly increase and when a predetermined speed and voltage are reached, it is necessary to transfer all of the motors to parallel operation if it is desired to still further increase the locomotive speed. When the foregoing predetermined speed is reached the generator voltage will be say 550 volts which is sufficient to energize the transfer relay 42 and raise its series of contactor bars relative to the four sets of switch contacts shown. Thereupon transfer of the motors 2—5 is initiated from series-parallel to parallel operation. The actual transfer is accomplished in the following manner. Energization of relay 42 breaks the circuit from wire 41 to voltage responsive field relay 43 which thereupon opens to break the circuit through wires 44 and 45 and accordingly de-energize the motor field relays 46 and 47 which, in turn, cause de-energization of the whole series of motor field relays 56, 57, 70, 71, 78 and 79. To obtain cooperative control of the engine-generator unit during this transition period, the transfer relay 42 simultaneously opens a previously closed circuit from battery wire 13 through wires 92 and 93 thereby inserting a resistance 94 in series with the exciter field 7 to lower the voltage across the generator but only to the extent that will maintain a predetermined amount of load on the engine so that a relatively small variation of governor controlled speed will occur. This has the advantage of allowing an extraordinary degree of smooth transition in the locomotive speed as the motors are brought into parallel operation for maximum speed. At the same time that the foregoing drop in generator voltage occurs there is established a circuit from wire 17 across a pair of contacts of relay 88 to a wire 95 across a pair of contacts of relay 42 to a wire 96 and thence across a pair of contacts of relay 70 to a wire 97 across a pair of contacts of a de-energized motor paralleling interlock relay 98 and thence through relay coil 32 to the negative battery line 25 to energize relay coil 32 thereby closing motor paralleling contactor 30. This will place motor 2 directly across the generator and shortcircuit motor 3, it being understood that series contactor 27 is still closed. However, energization of relay coil 32 simultaneously opens contacts 19 and thus de-energizes series control relay 20 which will open the series contactor 27 (upper portion of diagram) to discontinue the above shortcircuiting connection of motor 3. Opening of relay contacts 19 is accompanied by closure of an upper set of contacts of relay 32 thereby establishing a holding circuit for relay 32 through a wire 99, contacts of a current relay 100, a wire 101, across the upper contacts of coil 32 and thence through the relay coil to battery wire 25, this circuit being in parallel to the previously described circuit from wire 97 across lower contacts of a paralleling interlock relay to relay coil 32. Upon de-energization of series control relay 20 the lower set of contacts thereof will be closed and a circuit established from wire 97 across said lower contacts to the paralleling relay coil 98 and thence to the other side of the battery line 25. Energization of the paralleling relay 98 closes one set of contacts thereof indicated at 103 to place motor 3 in parallel directly across the generator.

The motors 4 and 5 are next connected in parallel in that energization of paralleling relay 98 establishes a circuit from wire 17 across a set of contacts of energized relay 88, wire 95, closed contacts of transfer relay 42, wire 96, across a set of contacts of motor field relay 78 to a wire 104, across the middle set of contacts of de-energized paralleling relay 64 and across one of the sets of contacts of paralleling relay 98 and thence through wire 105 to paralleling relay 33 and to the other battery line 25. Energization of paralleling relay 33 closes its upper set of contacts shown in the upper part of the diagram at 31 thereby placing motor 4 in parallel directly across the generator. At the same time parallel contacts 31 were closed a lower set of contacts 23 of paralleling relay 33 were opened thereby de-energizing the series control relay 24 to open contacts 28 (upper part of diagram). De-energization of series control relay 24 closes its lowermost contacts whereupon a circuit is established from 104 across said lower closed contacts and thence over to paralleling relay 64 to the other side of line 25. Energization of relay 64 closes a set of contacts 107 to place motor 5 in parallel directly across the generator. All of the motors are now individually connected in parallel across the generator.

To now build up the exciter battery field to normal strength for full load generator capacity, it is necessary to de-energize transfer relay 42 for shunting out resistor 94, it being understood that the parallel relays remain energized by the previously established holding circuit. The cutting out of resistor 94 is accomplished upon energization of the last paralleling relay 64 which breaks the transfer relay circuit starting from generator lead 9, wire 63 (near generator 1) across the now open lower contacts of relay 64 to wire 65, 66, 109, across one set of contacts of transfer relay 42 and thence through a resistor 90 to relay coil 42 and back to the other side of the main generator line 10. Deenergization of the relay 42 causes closure of one set of its contacts to again establish a circuit between wires 92 and 93 which shunts out resistor 94 of the battery exciter field 7. This permits the exciter field to build up to normal strength and thus establish voltage across generator 1 for full load operation. The locomotive will accordingly further accelerate and when the speed and accordingly the generator voltage successively reach increased values the voltage responsive relays 43 and 62 will sequentially cause their motor field relays to cut in motor field resistance to bring the locomotive up to the normal full speed capacity of generator 1 in the same manner as previously described for series-parallel operation.

TRANSFER OF MOTORS BACK TO SERIES-PARALLEL FROM PARALLEL

When the locomotive is operating in parallel as above described and should it encounter load conditions such as heavy grades sufficient to cause the generator current to increase to a point where the current exceeds the continuous rating of the generator, the motors are then automatically transferred back to their series-parallel operation. For example, when the current exceeds said continuous generator rating the current relay 100 trips to break two holding circuits, one circuit being between wires 99 and 101 which will de-energize paralleling relay 32 and the other circuit being between wires 110 and 111 to de-energize paralleling relay 33. The holding circuit 110 and 111 is from battery wire 25, relay 33, wires 115, 111, 110, 104 across the upper contacts of relay 64, wires 104' and 18 to battery wire 17. The holding circuit 99 and 101 is from wire 18, across the upper contacts of relay 98, wires 97, 99 and 101 across upper contacts of relay 32 to battery wire

25. The paralleling relays 32 and 33 are thus simultaneously de-energized to disconnect motors 2 and 4 from parallel. Simultaneously the series control relays 20 and 24 are energized to close contacts 27 and 28. Subsequently paralleling relays 64 and 98 are simultaneously energized to close contacts 103 and 107 to complete the series-parallel connection of all motors. Voltage responsive relays 43 and 62 will reclose if the voltage is sufficiently high thereby insuring minimum motor field strength but if the speed continually decreases the consequent voltage drop will successively de-energize relays 62 and 43 to successively increase the field strength.

Of course, if the locomotive is operating in parallel and, instead of encountering a heavier load that would trip the current relay, the conditions of operation should be such that the engineer reduces his speed with a consequent reduction of current, it is then seen that the current relay 100 would not trip and accordingly the motors would continue to operate in parallel even though the locomotive might be traveling at a very low speed. This would not do any harm because the current would still be within the continuous generator rating. However, if the engineer should now attempt to speed up the locomotive, then a heavier current would be drawn. If this current is sufficiently large as to be unsafe the current relay will trip and thereby transfer the motors from parallel to series-parallel.

SUMMARY OF SEQUENCE

The sequence of operations in shifting the motors from series-parallel to parallel and vice versa and of progressively increasing or decreasing the field strength of the motors in response to the locomotive speed may be summarized as follows:

*All motors in series-parallel*

(1) Upon closure of the reversing and throttle switches 11 and 12 all motors are brought into series-parallel connection across the generator 1 by energization of series relay 20 through circuit 18, 19 and 25 and simultaneous energization of series relay 24 through circuit 22, 23 and 25 thereby to close series contacts 27 and 28, the parallelling contacts 30 and 31 being open.

(2) Closure of series control relays 20 and 24 in parallel also closes the generator field relay 36 to establish the exciter circuit across contacts 39. This also establishes a holding circuit through wire 37 to relay 36 to maintain the exciter circuit throughout all operations until the engine is shut down.

*Partially reduced field—All motors*

(3) With the motors running in series-parallel under full motor field strength, the locomotive speed and voltage will increase until a predetermined generator voltage is reached whereupon a voltage responsive relay 43 closes at, say, 500 volts to reduce the field strength of motors 2 and 4 by closing motor field shunting relays 46 and 47. Closure of relay 46 then effects closing of relays 56 and 57 to reduce field strength of motors 3 and 5. This sequential reduction of field strength insures a smooth transition and speeding up of the motors.

*Fully reduced field—All motors*

(4) The locomotive speed and voltage thereupon further increase until a predetermined generator voltage is reached whereupon voltage responsive relay 62 closes at, say, 525 volts and the field strength is reduced first of motors 2 and 4 by closure of relays 70 and 71 and subsequently of motors 3 and 5 by closure of relays 78 and 79. Closure of these latter relays is controlled by initial closing of relay 70. Again a smooth transition and speeding up of the motors has been obtained.

*Transfer to parallel—Full field—All motors*

(5) When the locomotive speed and generator voltage reach say, 550 volts, then transfer relay 42 becomes responsive by being sufficiently energized to break the circuit for voltage responsive relay 43 so as to open all motor field shunting relays to establish full field strength on all motors.

*Partial engine load*

(6) Closing of transfer relay 42 simultaneously reduces the load on the engine-generator to a partial load by cutting in resistance 94 in exciter battery field.

*Motor 2 in parallel*

(7) (a) Above energization of transfer relay also simultaneously establishes a circuit through wires 95, 96 and 97 to close paralleling relay 32 which closes contact 30 to connect motor 2 in parallel but shortcircuit motor 3, the series contacts 27 of relay 20 still being closed.

(b) Energization of paralleling relay 32 causes de-energization of series control relay 20 to open contactors 27 thus discontinuing shortcircuiting of motor 3. (Holding circuit for relay 32 is established by wires 99 and 101 to relay 32.)

*Motor 3 in parallel*

(c) Simultaneously with de-energization of series control relay 20 its lower contacts close a circuit to energize paralleling relay 98 which closes contacts 103 for placing motor 3 in parallel.

*Motor 4 in parallel*

(d) Energization of paralleling relay 98 initiates closing of contacts 31 of paralleling relay 33 to place motor 4 in parallel and short circuit motor 5.

(e) Relay 33 in turn de-energizes series control relay 24 so that it opens to discontinue shortcircuiting of motor 5.

*Motor 5 in parallel*

(f) De-energization of series relay 24 then closes contacts 107 of paralleling relay 64 to place motor 5 in parallel.

Throughout all of the above paralleling operations the motor fields are full strength and the transition from series-parallel to parallel is obtained in a smooth manner to give an increasing speed.

*Full engine load restored*

(8) Exciter battery field 7 begins to build up upon closing of last paralleling relay 64 which de-energizes transfer relay 42 by breaking circuit 63, 65, 109 and 90 and thereby connect wires 92 and 93 to shunt out exciter field resistor 94. The locomotive speed will now further increase. (Holding circuit 32, 101, 99, 97 across contacts of relays 70, 78, 104, 104' and 18 maintains paralleling relays closed upon de-energization of transfer relay 42.)

*Partially reduced field—All motors*

(9) As the speed and voltage increase to a predetermined value the voltage responsive field relay 43 becomes energized to close motor field shunting relays 46, 47, 56 and 57 to decrease the field strength of motors 2—5 thereby to further increase the motor speed. (Voltage responsive field relay 62 remains de-energized during parallel operation so that the second set of motor field relays 70, 71, 78 and 79 are inactive and hence fields are not further reduced.)

*Transfer back to series-parallel: motors 2 and 4 disconnected from parallel operation*

(10) If the locomotive speed decreases on account of the load increasing to a point requiring current greater than the continuous generator rating, then current relay 100 (which operates below the voltage of responsive relay 43) opens to break the holding circuits 99, 101 and 110, 111 to paralleling relays 32 and 33 thereby to drop motors 2 and 4 out of parallel and to re-energize series control relays 20 and 24. Motors 3 and 5 momentarily remain in their parallel condition.

*Motors 2 and 4 connected in series with motors 3 and 5 respectively*

(11) Energization of relays 20 and 24 closes series contacts 27 and 28 between motors 2 and 3 and 4 and 5 and simultaneously de-energizes paralleling relays 98 and 64 to open paralleling contacts 103 and 107 to break the momentarily continuing parallel connection of motors 3 and 5. A series-parallel connection is thereby established for motors 2 and 3 and for motors 4 and 5.

*Fully reduced field re-established for all motors (series-parallel)*

(12) Voltage responsive field relay 43 is closed provided that the generator voltage is say 500 volts and relay 62 is closed provided the voltage is say 525 volts. With both relays closed, all motor field shunting relays are energized thereby causing the field strength of all the motors to be reduced so as to insure greatest speed for the series-parallel operation.

*Fields of all motors sequentially increased (series-parallel)*

(13) If the locomotive speed and voltage should further decrease, then voltage responsive relay 62 will open to drop out motor field shunting relays 70, 71, 78 and 79 to increase the field strength of the motors and should the speed and voltage drop still further, then the voltage responsive field relay 43 will open to drop out motor field shunting relays 46, 47, 56 and 57 to still further increase the field strength of all motors.

To reverse the direction of operation of the locomotive, the operator connects the reversing switch 11 with wire 112 so as to energize reversing relays 113. These relays would then throw the reversing switches 114 on each of the respective motors. The reversing contacts 114 are diagrammatically shown as separated from the relays 113, but this is merely for simplicity of the diagram. The operation of the reversing relays 113 still maintains energization of the control lead 17 so that series-parallel to parallel operation during reverse operation is the same as for forward operation.

From the disclosure herein, it is seen that I have provided an improved control circuit and mode of operation whereby the engine generator unit can smoothly and continuously increase the locomotive speed from a starting position up to maximum high speed and back again automatically in response to the speed of the locomotive as reflected in the voltage and current conditions of the generator. This smooth increase and decrease of speed is accomplished in cooperation with maintaining a partial load on the engine-generator unit during transfer from series-parallel to full parallel or vice versa thereby assuring continuous application of power of the locomotive trucks. To utilize this supply of partial power and to gradually transfer the motors from series-parallel to parallel or vice versa the various series control and paralleling relays are sequentially energized and so interlocked as described that a certain number of motors are continuously supplied with power during the transfer operation while the remaining motors are being sequentially shifted over to the parallel operation or vice versa as the case may be.

It will of course be understood that various changes in details of construction and arrangement of parts may be made by those skilled in the art without departing from the spirit of the invention as set forth in the appended claims.

I claim:

1. A variable speed control apparatus for a power system having a generator and a plurality of motor sets in which each set has at least a pair of motors comprising, in combination, means for connecting the motors of each set in series-parallel with the generator, and means responsive to a predetermined condition of operation for automatically sequentially transferring motors of said sets to parallel across the generator and disconnecting their series-parallel relation, whereby power from the generator is continuously supplied to at least some of said motors during said transfer operation.

2. A variable speed control apparatus for a power system having a generator and a plurality of motor sets in which each set has at least a pair of motors comprising, in combination, means for connecting the motors of each set in series-parallel with the generator, means responsive to a predetermined condition of operation for automatically transferring the motors of one set to parallel across the generator while the remainder of said motor sets continue to operate in series-parallel, and means responsive to completion of said parallel connections to initiate the paralleling of each motor of the next set across the generator and disconnecting their series-parallel relation, whereby power from the generator is continuously supplied to at least some of said motors during said transfer operation.

3. A variable speed control apparatus for a power system having a generator and a plurality of motor sets in which each set has at least a pair of motors comprising, in combination, means for connecting the motors of each set in series-parallel with the generator, means responsive to a predetermined condition of operation for connecting one motor of one set in parallel across the generator and for shortcircuiting the second motor of such set while the remainder of said motor sets continue to operate in series-parallel, means for subsequently connecting said second motor in parallel across the generator and discontinuing said shortcircuit, and means controlled by the completion of the paralleling of said first two motors for effecting a similar sequence of connections for the motors of another set, whereby power from the generator is continuously supplied to at least some of said motors during said transfer operation.

4. The combination set forth in claim 1 further characterized by the provision of voltage responsive means adapted during either series-parallel or parallel operation to decrease the field strength of said motors automatically upon occurrence of a pedetermined voltage thereby to increase the speed of the motors.

5. A variable speed control apparatus for a power system for an engine driven generator having a field and a plurality of motor sets in which each set has at least a pair of motors comprising, in combination, means for connecting the motors of each set in series-parallel with the generator, means responsive to a predetermined condition of operation for automatically sequentially disconnecting the motors from their series-parallel operation and transferring the same to parallel with the generator while the motors which remain to be transferred maintain their series-parallel until transfer thereof is effected, and means for reducing the strength of said generator field automatically during paralleling of the motors, whereby the engine drives the generator at part load so as to operate such of the motors as are connected to the generator during said transferring operation.

6. The combination set forth in claim 5 further characterized by the provision of means whereby the means for reducing the strength of the generator field is controlled by the operation of said transferring means.

7. The combination set forth in claim 5 further characterized by the provision of means whereby the means for reducing the strength of the generator field is controlled by the operation of said transferring means, means for discontinuing the operation of said transfer means upon completion of the transfer operation, and means for thereafter maintaining said motors in parallel.

8. The combination set forth in claim 5 further characterized by the provision of means for restoring the generator field to its normal strength automatically upon completion of the paralleling operation of all motors.

9. The combination set forth in claim 5 further characterized by the provision of means whereby the reduction of generator field strength is effected automatically upon initiation of the paralleling of the motors.

10. The combination set forth in claim 5 further characterized by the provision of means for restoring the generator field to its normal strength automatically upon completion of the paralleling operation of all motors, and means for transferring the motors back to their series-parallel connections automatically in response to a predetermined condition of operation.

11. The combination set forth in claim 5 further characterized by the provision of means for restoring the generator field to its normal strength automatically upon completion of the paralleling operation of all motors, and means controlled by the generator current for initiating transfer of the motors back to their series-parallel operation.

12. The combination set forth in claim 5 further characterized by the provision of means for restoring the generator field to its normal strength automatically upon completion of the paralleling operation of all motors, and means controlled by the generator current for initiating transfer of the motors back to their series-parallel operation by sequentially disconnecting the motors from their parallel operation.

13. The combination set forth in claim 5 further characterized by the provision of means for restoring the generator field to its normal strength automatically upon completion of the paralleling operation of all motors, and means for thereafter reducing the field strength of the motors automatically upon occurrence of a predetermined generator voltage, thereby to increase the motor speed.

14. A variable speed control apparatus for a power system having a generator and a plurality of motor sets in which each set has at least a pair of motors and said generator has a field comprising, in combination, means for connecting the motors of each set in series-parallel with the generator, paralleling means for connecting the motors of each set in parallel across the generator and disconnecting said series-parallel relation, a transfer relay responsive to a predetermined condition of operation for initiating operation of said paralleling means, means controlled by said transfer relay for reducing the generator field strength when operation of said transfer relay is initiated, means for discontinuing the operation of said transfer relay so as to restore the strength of the generator field, and means for maintaining said parallel motor operation after discontinuance of the transfer relay operation.

JOHN J. STAMM.